United States Patent
Kubica et al.

(10) Patent No.: US 6,772,979 B2
(45) Date of Patent: Aug. 10, 2004

(54) METHOD AND DEVICE FOR REDUCING THE VIBRATORY MOTIONS OF THE FUSELAGE OF AN AIRCRAFT

(75) Inventors: François Kubica, Toulouse (FR); Christophe Le Garrec, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/437,980

(22) Filed: May 15, 2003

(65) Prior Publication Data

US 2003/0234324 A1 Dec. 25, 2003

(30) Foreign Application Priority Data

Jun. 21, 2002 (FR) .............................. 02 07715

(51) Int. Cl.[7] .............................................. B04C 13/16
(52) U.S. Cl. ..................... 244/195; 244/76 C; 701/3; 701/10
(58) Field of Search .............................. 244/75 A, 76 R, 244/76 C, 194, 195, 203; 701/3, 4, 7, 8, 9, 10, 11; 416/500; 415/119

(56) References Cited

U.S. PATENT DOCUMENTS

| | | | |
|---|---|---|---|
| 4,312,042 A | * 1/1982 | Bateman | |
| 4,479,620 A | 10/1984 | Rogers et al. | |
| 4,562,546 A | * 12/1985 | Wykes et al. | 244/75 A |
| 4,615,497 A | 10/1986 | Seeler et al. | |
| 4,706,902 A | 11/1987 | Destuynder et al. | |
| 4,725,020 A | * 2/1988 | Whitener | 244/76 R |
| 4,796,192 A | * 1/1989 | Lewis | 244/75 R |
| 5,135,186 A | 8/1992 | Ako | |
| 5,167,385 A | * 12/1992 | Hafner | 244/76 R |
| 5,186,416 A | * 2/1993 | Fabre et al. | 244/75 R |
| 5,564,656 A | * 10/1996 | Gilbert | 244/195 |
| 5,588,620 A | 12/1996 | Gilbert | |
| 6,161,801 A | * 12/2000 | Kelm et al. | 244/76 C |

* cited by examiner

Primary Examiner—Galen L. Barefoot
(74) Attorney, Agent, or Firm—Stevens, Davis, Miller & Mosher, LLP

(57) ABSTRACT

Method and device for reducing the vibratory motions of the fuselage of an aircraft.

According to the invention, accelerometers (9, 10) are mounted on engines (M1, M4) of the aircraft (1) and, with the aid of the accelerometric measurements thus obtained and of the aeroelastic model of said aircraft, control commands (dZ, dY) to be applied to the ailerons (M1 to M4) so as to counteract the oscillations of said engines are determined.

10 Claims, 2 Drawing Sheets

METHOD AND DEVICE FOR REDUCING THE VIBRATORY MOTIONS OF THE FUSELAGE OF AN AIRCRAFT

The present invention relates to a method and a device for reducing the vibratory motions of the fuselage of an aircraft, which are engendered by one or more engines.

It is known that, for the sake of the comfort of the passengers and crew and for the sake of the lifetime of the aircraft, one seeks to eliminate the vibrations of the fuselage as far as possible. To do this, it is customary to detect and to measure the vibrations in the fuselage and to act on the causes of these vibrations so as to reduce their effects.

When these causes, for example the engines, are far from the fuselage and when, moreover, the aircraft is of large dimensions, such a process of reducing the vibrations of the fuselage is rather ineffective, because of the distance separating said fuselage from said causes of vibration.

The object of the present invention is to remedy this drawback in the case where the cause of said vibrations is one or more engines of the aircraft.

To this end, according to the invention, the method for reducing the vibratory motions of the fuselage of an aircraft comprising two fixed wings which are symmetric with respect to said fuselage, each of said wings being provided with control surfaces articulated to its trailing edge and bearing at least one engine, is noteworthy in that:

at least one accelerometer is associated with at least one engine;

the accelerations undergone by said engine, thus equipped with at least one accelerometer, are measured in at least one direction transverse to said engine;

with the aid of the accelerometric measurements thus obtained, at least one oscillatory control command is determined which, applied to at least one control surface of the wing bearing said engine, is able to counteract the vibratory motions of said engine in said direction; and said control command is applied to said control surface.

Thus, the vibratory motions of the fuselage are detected at their source (the engine or engines) and are counteracted in proximity to their source, since the control surfaces of an aircraft wing are never very far from the engines borne by it. The reduction in the vibrations within the fuselage, in accordance with the present invention, may therefore be particularly efficient.

Of course, the accelerometers associated with the engines may be mounted directly on the latter or else placed at a point close to said engines, where the vibrations of the latter are felt, for example the pylon which bears them.

Preferably, in the method according to the invention, said control command is determined from preestablished relations which emanate from the aeroelastic model, specific to said aircraft, and which, for each acceleration undergone by said aircraft at the location of said engine and in said direction, are able to deliver such a control command. This aeroelastic model if of course known to the constructor of the aircraft, who has calculated it theoretically. The preestablished relations, used in the present invention, may be derived from this theoretical model, or from a model established in a purely experimental manner, during test flights of the aircraft. As a variant, the model used may be the theoretical model, supplemented and/or improved in an experimental manner.

It is known that such an aeroelastic model indicates, among other information, on the one hand, the amplitude, the frequency and the phase of the vibrations engendered in the fuselage of the aircraft as a function of the accelerations undergone by the aircraft at the level of each engine and, on the other hand, the amplitude, the frequency and the phase of the vibrations engendered in the fuselage of the aircraft by the to and fro swinging of each control surface. Thus, this aeroelastic model of the aircraft makes it possible to establish said relations determining the command to be addressed to a control surface so as to counteract the measured vibrations of an engine, so that the vibrations of the fuselage are zero, or at the very least as small as possible.

Thus, in the method in accordance with the present invention, said control command is calculated from the information supplied, as a function of said accelerometric measurements, by a table in which are recorded said relations emanating from the aeroelastic model of the aircraft.

Preferably, the direction of measurement of said accelerations is vertical and/or horizontal (that is to say, in the latter case, lateral with respect to the fuselage).

Advantageously, the control surfaces chosen to counteract the vibratory motions of the engine or engines are the ailerons of the aircraft, since the symmetric deflection of ailerons symmetric with respect to the fuselage influences the vertical acceleration of the aircraft, whereas the antisymmetric deflection of these ailerons influences its lateral acceleration.

The method in accordance with the present invention is particularly advantageous to implement in the case of atmospheric turbulence during flight. It is known indeed that the fixed wings of an aircraft are relatively flexible, so that, on the appearance of turbulence, the engines of the aircraft (particularly the outer engines) begin to oscillate. Initially, the oscillation is mainly vertical and in phase for the two wings. However, the aircraft not being perfectly symmetric with respect to the longitudinal axis of the fuselage, a moment occurs at which the engines of the two wings no longer oscillate in phase, their vibratory motions then having a lateral component, so that said engines oscillate on approximately elliptic trajectories.

Another object of the present invention is therefore to be able to counter such quasi-elliptic vibratory motions of the engines.

To this end, in accordance with the present invention:

at least one accelerometer is associated with at least one engine of each wing;

the accelerations undergone by each of said engines, thus each equipped with at least one accelerometer, are measured in at least one direction transverse to said engine;

with the aid of the accelerometric measurements thus obtained, at least one oscillatory control command is determined which, applied to control surfaces of said wings, is able to counteract the vibratory motions of said engines in said direction; and said control command is applied to said control surfaces.

Preferably, for the sake of simplification:

the accelerations undergone by two engines of said aircraft, which are symmetric with respect to said fuselage, are measured in said direction transverse to said engines;

the average of said accelerations undergone by these two symmetric engines is calculated;

a common control command is determined with the aid of said relations preestablished from said aeroelastic model; and said common control command is applied to two control surfaces which are symmetric with respect to said fuselage.

In the case where each wing of said aircraft comprises at least two types of ailerons, namely at least one outer aileron and at least one inner aileron, it is possible:

to determine a first control command able to counteract the vertical vibratory motions of at least two engines which are symmetric with respect to said fuselage;

to determine a second control command able to counteract the lateral vibratory motions of said engines;

to apply said first control command to at least two ailerons of one of the two types, disposed symmetrically with respect to said fuselage, in such a way that these two ailerons pull up symmetrically in the same direction; and to apply said second control command to at least two ailerons of the other of the two types, likewise disposed symmetrically with respect to said fuselage, in such a way that these two ailerons deflect antisymmetrically in opposite directions.

In the implementation of the method in accordance with the present invention, in the case where the aircraft comprises several engines per wing, it is obvious that the outer engines are the ones which undergo the oscillatory vibrations of largest amplitude, so that, for good reduction of the vibratory motions of the fuselage, it is sufficient for only these outer engines to be provided with accelerometers.

The present invention relates moreover to a device for reducing the vibratory motions of the fuselage of an aircraft comprising two fixed wings which are symmetric with respect to said fuselage, each of said wings being provided with control surfaces articulated to its trailing edge and bearing at least one engine. Such a device is noteworthy in that it comprises:

accelerometers associated with at least two engines mutually symmetric with respect to said fuselage and able to measure the respective accelerations of these engines in at least one direction transverse to said engines;

a table in which are recorded relations preestablished from the aeroelastic model relating specifically to said aircraft;

means of calculation able to calculate, with the aid of the accelerometric measurements delivered by said accelerometers and of the preestablished relations of said table, at least one control command which, applied to control surfaces which are symmetric with respect to said fuselage, is able to counteract the vibratory motions of said engines in said direction; and means for applying said control command to said control surfaces.

In the case where said aircraft is provided with a system of electric flight controls, it is advantageous for said means of calculation and said means of application of said control command to form part of said system of electric flight controls.

The figures of the appended drawing will elucidate the manner in which the invention may be embodied. In these figures, identical references designate similar elements.

Figure 1:
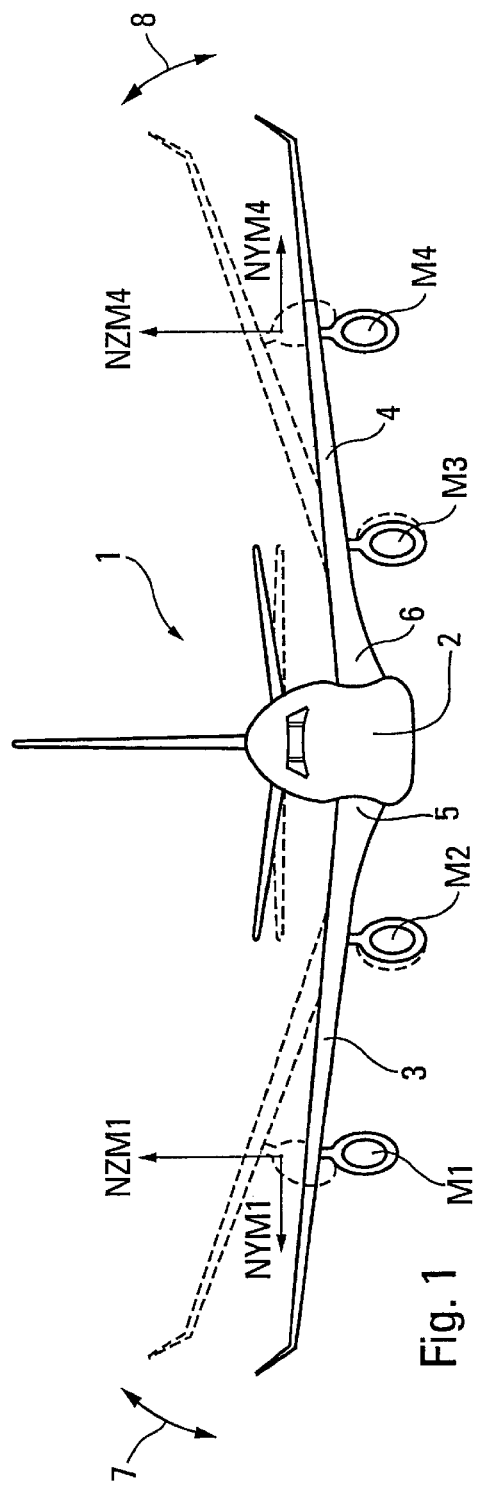
FIG. 1 is a diagrammatic front view of a wide-bodied four-engine aircraft undergoing atmospheric turbulence.

The aircraft 1, represented diagrammatically front-on in FIG. 1, comprises a fuselage 2 and two wings 3 and 4, disposed symmetrically with respect to said fuselage. Each wing bears two engines and the four engines of the aircraft bear the references M1 to M4, the engines M1 and M2 being borne by the wing 3 and the engines M3 and M4 by the wing 4.

The wings 3 and 4 are flexible and, when the aircraft 1 is subjected to atmospheric turbulence, they oscillate about their respective root, 5 or 6, as illustrated in FIG. 1 by the dashed positions and by the arrows 7 and 8. This results in the engines M1 to M4 starting to oscillate themselves, the oscillations of the outer engines M1 and M4 having, owing to their position, a larger amplitude than those of the inner engines M2 and M3. As mentioned above, these oscillations comprise a vertical component and a horizontal component, so that the outer engines M1 and M4 undergo oscillatory vertical accelerations, designated NZM1 and NZM4 respectively, as well as oscillatory lateral accelerations, designated NYM1 and NYM4 respectively.

Of course, the oscillations of the engines induce vibrations in the fuselage 2, which impair the comfort of the passengers and the crew and cause fatigue to the structure of the aircraft 1.

Figure 2:
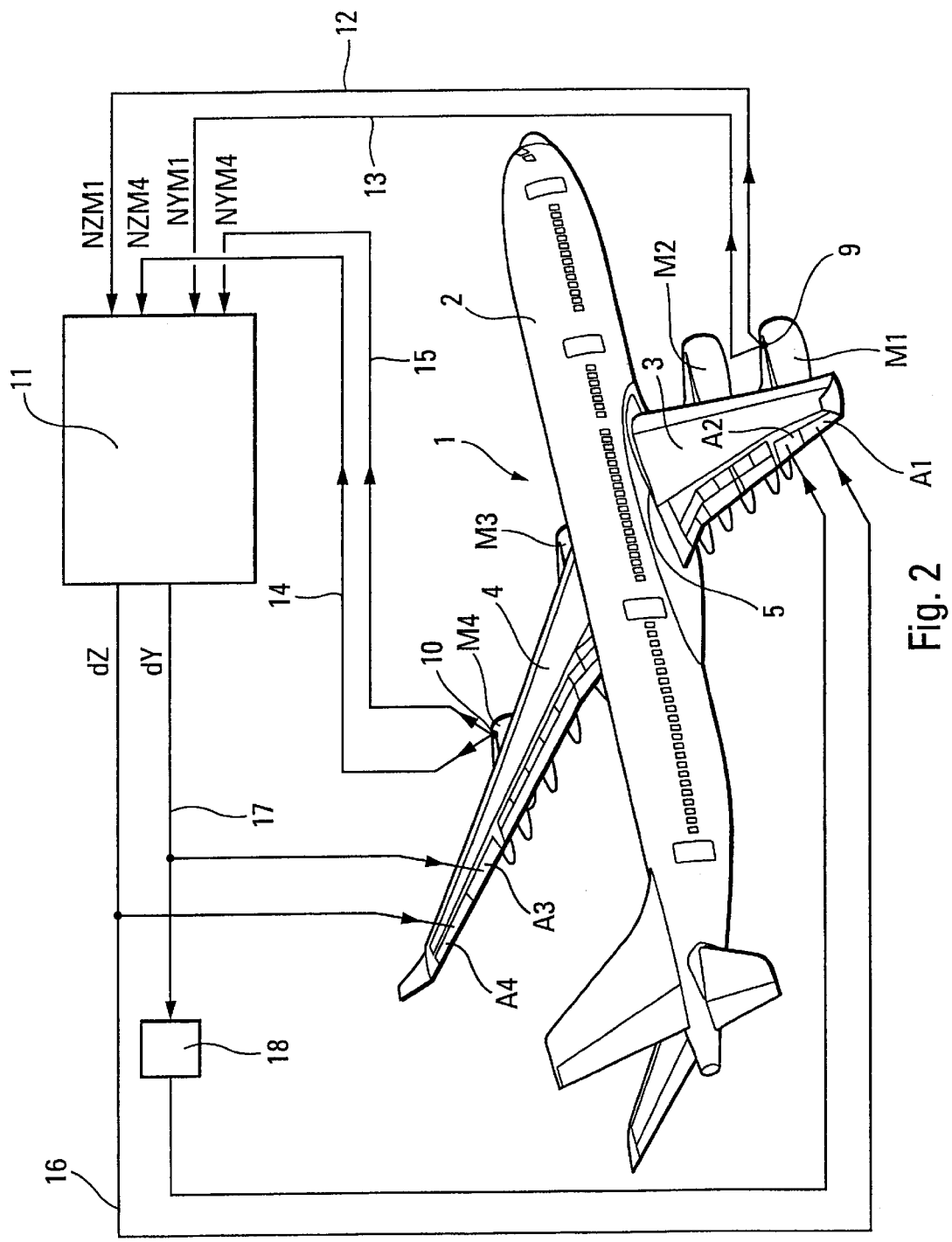
FIG. 2 is a diagrammatic view of an exemplary implementation of the present invention for counteracting the effects of this turbulence on said aircraft.

In FIG. 2, the four-engine wide-bodied aircraft 1 has been represented in perspective, viewed from above, and depicted therein are the various control surfaces articulated to the trailing edge of the wings 3 and 4. Among other control surfaces, the wing 3 bears an outer aileron A1 and an inner aileron A2. Likewise, the wing 4 comprises an inner aileron A3 (symmetric with the aileron A2) and an outer aileron A4 (symmetric with the aileron A1).

Moreover, each outer engine M1 and M4 bears an accelerometric system 9 or 10, respectively, able to measure the oscillatory accelerations NZM1, NYM1, NZM4 and NYM4.

Furthermore, in the aircraft 1 is disposed a control device 11 (represented outside said aircraft 1 in FIG. 2 for reasons of clarity of the drawing), able to control the ailerons A1 to A4 so as to counteract, inside the fuselage 2, the effects of the oscillations of said engines. The control device 11, preferably, forms part of the system (not represented) of electric flight controls of the aircraft 1.

The control device 11 receives, respectively via lines 12 and 13, the measurements of the vertical acceleration NZM1 and of the lateral acceleration NYM1 which are delivered by the accelerometric system 9. Likewise, respectively via lines 14 and 15, the control device 11 receives, from the accelerometric system 10, the measurements of the vertical acceleration NZM4 and of the lateral acceleration NYM4.

From the measurements of the accelerations NZM1, NZM4, NYM1 and NYM4, the control device 11 calculates a first control command dZ which, applied in common and in a symmetric manner to the outer ailerons A1 and A4 (or to the inner ailerons A2 and A3) by a line 16, is able to counteract the effects of the vertical accelerations NZM1 and NZM4, and a second control command dY which, applied in common and in an antisymmetric manner to the inner ailerons A2 and A3 (or to the outer ailerons A1 and A4) by a line 17, is able to counteract the effects of the lateral accelerations NYM1 and NYM4. An inverter 18 is then interposed in the line 17 so that the deflections of the ailerons A2 and A3 (or A1 and A4) are antisymmetric, that is to say of like amplitude, but of opposite directions.

Figure 3:
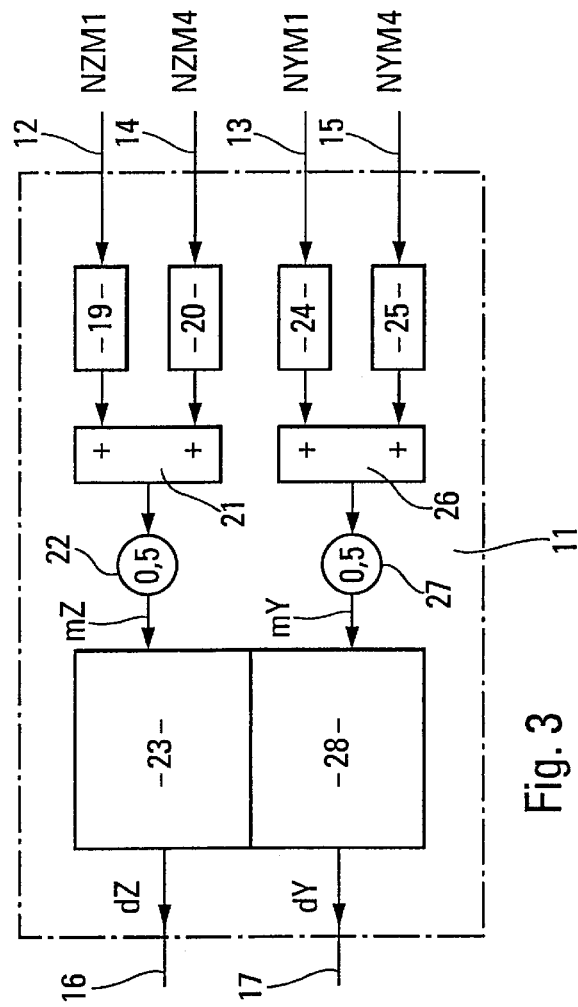
FIG. 3 shows the schematic diagram of the device used in the exemplary implementation of the invention, illustrated by FIG. 2.

In the exemplary implementation of FIG. 3, the control device 11 comprises a filter 19 and a filter 20, which respectively receive the measurements of the vertical accelerations NZM1 and NZM4 of the lines 12 and 14. The object of the filters 19 and 20 is to remove the background noise and to perform the spectrum antiailerizing function. They perform a filtering at high frequency (greater than 10 Hz), which does not affect the performance of the device 11. The accelerations NZM1 and NZM4, thus filtered, are added together in an adder 21, after which the sum thus obtained is divided by two at 22. One thus obtains a signal mZ corresponding to the average of the accelerations NZM1 and NZM4.

Furthermore, the control device 11 comprises a table 23, which is preestablished from the aeroelastic model describing the vibratory moments of the aircraft 1 (possibly supplemented with results of flight tests) and to which the signal mZ is addressed. In response to this signal mZ, the table 23 is able to deliver, at its output 16, the amplitude, the frequency and the phase of the first control command dZ which, applied in a symmetric manner to the outer ailerons A1 and A4, will allow the latter to create vertical accelerations on the fuselage 2 which oppose the vertical accelerations NZM1 and NZM4.

In a manner symmetric to what has just been described, the lateral accelerations NYM1 and NYM4 are, in the control device 11, filtered by respective filters 24 and 25 (similar to the filters 19 and 20), then added together in an adder 26, their sum thereafter being divided by two at 27. The average mY thus obtained is addressed to a table 28 which is also preestablished from the aeroelastic model of the aircraft 1 and which is able to deliver at its output 17, for this average mY, the amplitude, the frequency and the phase of the second control command dY which, applied in an antisymmetric manner (by virtue of the inverter 18) to the inner ailerons A2 and A3, will allow the latter to create lateral accelerations on the fuselage 2 which oppose the horizontal accelerations NYM1 and NYM4.

So as not to continually invoke the servocontrols actuating the ailerons A1 to A4, it may be advantageous to provide, for example at the inputs 12 to 15 of the control device 11, threshold devices (not represented) allowing the generation of the commands dZ and dY only when the accelerations NZM1, NZM4, NYM1 and NYM4 exceed a predetermined threshold and/or a predetermined duration.

What is claimed is:

1. A method for reducing vibratory motions of a fuselage of an aircraft, said vibratory motions being engendered by engines of said aircraft which comprises two fixed wings which are symmetric with respect to said fuselage, each of said wings being provided with control surfaces articulated to its trailing edge and bearing at least one of said engines, said method comprising:
   (a) associating at least one accelerometer with at least one of said engines;
   (b) measuring accelerations undergone by said at least one of said engines in at least one direction transverse to said at least one of said engines, wherein said direction is horizontal, that is to say lateral with respect to said aircraft;
   (c) with the aid of the accelerometric measurements thus obtained, determining at least one oscillatory control command which, applied to at least one control surface of the the one of said wings bearing said at least one of said engines, is able to counteract the vibratory motions of said at least one of said engines in said direction; and
   (d) applying said control command to said at least one control surface.

2. The method as claimed in claim 1, wherein step (C) comprises determining said control command from preestablished relations which emanate from the aeroelastic model, specific to said aircraft, and which, for each acceleration undergone by said aircraft at the location of said at least one of said engines and in said direction, are able to deliver such a said control command.

3. The method as claimed in claim 1, further comprising:
   (e) associating at least one accelerometer with at least one of said engines of each of said wings;
   (f) measuring accelerations undergone by each of said engines, thus each equipped with said at least one accelerometer, in at least one direction transverse to said each of said engines;
   (g) with the aid of accelerometric measurements thus obtained in step (f), determining at least one oscillatory control command which, applied to control surfaces of said wings, is able to counteract the vibratory motions of said engines in said direction of step (f); and
   (h) applying said control command determined in step (g) to said control surfaces.

4. The method as claimed in claim 2, further comprising:
   (e) measuring accelerations undergone by two of said engines of said aircraft, which are symmetric with respect to said fuselage, in said direction transverse to said engines;
   (f) calculating an average of said accelerations undergone by said two symmetric engines;
   (g) determining a common control command with the aid of said relations preestablished from said aeroelastic model; and
   (h) applying said common control command to two of said control surfaces which are symmetric with respect to said fuselage.

5. The method as claimed in claim 1, wherein said at least one direction of measurement of said accelerations includes a vertical direction.

6. The method as claimed in claim 1, wherein said at least one control surface is an aileron.

7. The method as claimed in claim 2, in which each wing of said aircraft comprises at least two types of ailerons, namely at least one outer aileron and at least one inner aileron, further comprising:
   (e) determining a first control command able to counteract vertical vibratory motions of at least two of said engines which are symmetric with respect to said fuselage;
   (f) determining a second control command able to counteract lateral vibratory motions of said symmetric engines;
   (f) applying said first control command to at least two ailerons, of one of the two types, disposed symmetrically with respect to said fuselage, in such a way that these two ailerons pull up symmetrically in the same direction; and
   (f) applying said second control command to at least two ailerons of the other of the two types, likewise disposed symmetrically with respect to said fuselage, in such a way that these two ailerons deflect antisymmetrically in opposite directions.

8. The method as claimed in claim 2, applied to an aircraft comprising several engines per wing, which is implemented only for the outer engines of the aircraft.

9. A device for reducing the vibratory motions of a fuselage of an aircraft, said vibratory motions being engendered by the engines of said aircraft which comprises two fixed wings which are symmetric with respect to said fuselage, each of said wings being provided with control surfaces articulated to its trailing edge and bearing at least one of said engines, said device comprising:

(a) accelerometers associated with at least two of said engines mutually symmetric with respect to said fuselage and able to measure the respective accelerations of these engines in at least one direction transverse to said engines, wherein said direction is horizontal, that is to say lateral with respect to said aircraft;

(b) at least one table in which are recorded relations preestablished from the aeroelastic model relating specifically to said aircraft;

(c) means of calculation able to calculate, with the aid of the accelerometric measurements delivered by said accelerometers and of the preestablished relations of said table, at least one control command which, applied to control surfaces which are symmetric with respect to said fuselage, is able to counteract the vibratory motions of said engines in said direction; and (d) means for applying said control command to said control surfaces.

10. The device as claimed in claim 9, for an aircraft provided with a system of electric flight controls, wherein said means of calculation and said means of application of said control command farm part of said system of electric flight controls.

* * * * *

UNITED STATES PATENT AND TRADEMARK OFFICE
CERTIFICATE OF CORRECTION

PATENT NO.        : 6,772,979 B2                                  Page 1 of 1
APPLICATION NO.   : 10/437980
DATED             : August 10, 2004
INVENTOR(S)       : François Kubica et al.

It is certified that error appears in the above-identified patent and that said Letters Patent is hereby corrected as shown below:

On the title page: Item (75) for the Inventors currently reads:

(75) Inventors:   François Kubica, Toulouse (FR);
                  Christophe Le Garrec, Toulouse (FR)

and should read:

(75) Inventors:   François Kubica, Toulouse (FR);
                  Christophe Le Garrec, Toulouse (FR);
                  Detlef Walter Schierenbeck, Bremen (DE)

Signed and Sealed this
Sixth Day of December, 2011

David J. Kappos
*Director of the United States Patent and Trademark Office*